United States Patent [19]
Covington et al.

[11] Patent Number: 5,871,567
[45] Date of Patent: Feb. 16, 1999

[54] DUAL MEDIA AIR FILTER WITH ELECTROSTATIC CHARGE

[75] Inventors: Edward A. Covington; Demetrios A. Tsengouras, both of Gastonia, N.C.

[73] Assignee: Dana Corporation, Toledo, Ohio

[21] Appl. No.: 766,475

[22] Filed: Dec. 12, 1996

[51] Int. Cl.⁶ .................................................. B03C 3/011
[52] U.S. Cl. ............................. 96/58; 55/385.3; 55/487; 55/521
[58] Field of Search .............................. 55/486, 487, 524, 55/528, 385.3, DIG. 39, 521; 96/57, 58; 95/69

[56] References Cited

U.S. PATENT DOCUMENTS

| | | | |
|---|---|---|---|
| Re. 30,782 | 10/1981 | Van Turnhout | 264/435 |
| 3,998,916 | 12/1976 | Van Turnhout | 264/436 |
| 4,323,374 | 4/1982 | Shinagawa et al. | 55/489 X |
| 4,678,578 | 7/1987 | Nodes et al. | 55/497 X |
| 4,758,460 | 7/1988 | Spicer et al. | 55/487 X |
| 4,902,306 | 2/1990 | Burnett et al. | 55/528 X |
| 5,037,455 | 8/1991 | Scheineson et al. | 55/487 X |
| 5,123,936 | 6/1992 | Stone et al. | 55/487 X |
| 5,268,009 | 12/1993 | Thompson et al. | 55/497 X |
| 5,441,550 | 8/1995 | Hassenboehler, Jr. et al. | 55/486 |
| 5,525,136 | 6/1996 | Rosen | 55/DIG. 39 |
| 5,540,756 | 7/1996 | Hoppitt et al. | 55/DIG. 39 |

FOREIGN PATENT DOCUMENTS 824448  12/1959  United Kingdom ............. 55/DIG. 39

*Primary Examiner*—Richard L. Chiesa
*Attorney, Agent, or Firm*—Millen, White, Zelano, & Branigan, P.C.

[57] ABSTRACT

A filter element useful for filtering intake air for internal combustion engines includes a first filter media separated by an air space from a second filter media. The second filter media has a greater air permeability than the first filter media, but is electrostatically charged. As a result of this arrangement, the capacity of the filter element is enhanced because large particles are trapped by the first filter media and smaller particles are trapped by the second filter media. As a result, the filter element has a longer life because, for a given contaminant condition of an air stream, unacceptable clogging of the filter element takes longer.

9 Claims, 3 Drawing Sheets

DUAL MEDIA AIR FILTER WITH ELECTROSTATIC CHARGE

The present invention relates to air filters useful with internal combustion engines and, more particularly, the present invention relates to air filters useful with internal combustion engines which are specially configured to increase capacity and efficiency.

BACKGROUND OF THE INVENTION

Air filters are well known devices in which an air stream is drawn or forced into a housing and caused to pass through a filter media configured to remove dirt, dust and other particles entrained in the air stream. The air stream cleaned by the filter is thereafter used in devices such as internal combustion engines.

The filter element is disposed in a filter retainer or housing between an air inlet and air outlet. Generally, the seal is positioned to seal the air inlet from the air outlet so that all air passing out of the outlet has been passed through the filter element. For most automotive applications, the filter element is conveniently constructed of pleated paper with pleats facing upstream toward the air stream inlet and downstream toward the air stream outlet. These filters may be of a panel, radial or frusto-conical configuration. Many light duty air filters used in automotive applications to filter inlet air for internal combustion engines are configured as rectangular panels to filter the high velocity air consumed by the engines.

There is a continuing effort to improve the performance and efficiency of air filters by reducing restriction to air flow so as to enhance fuel consumption and engine power while encouraging laminar air flow and increasing capacity and thus the useful life of air filters.

SUMMARY OF THE INVENTION

In view of the aforementioned considerations, it is a feature of the present invention to provide a new and improved air filter which has enhanced efficiency and an increased capacity for retention of trapped particles.

In accordance with one aspect of the invention, the filter element, useful for filtering inlet air for an internal combustion engine, includes a first filter media and a second filter media. The second filter media is positioned downstream of the first filter media and separated therefrom by an air space. The second filter media is also electrostatically charged.

In accordance with a more specific aspect of the invention, the second filter media is more permeable to air flow than the first filter media and, in accordance with the still further aspect of the invention, the filter medias are both made of cellulose material and are pleated.

In still a further aspect of the invention, the aforedescribed filter element is in combination with the air intake of an internal combustion.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
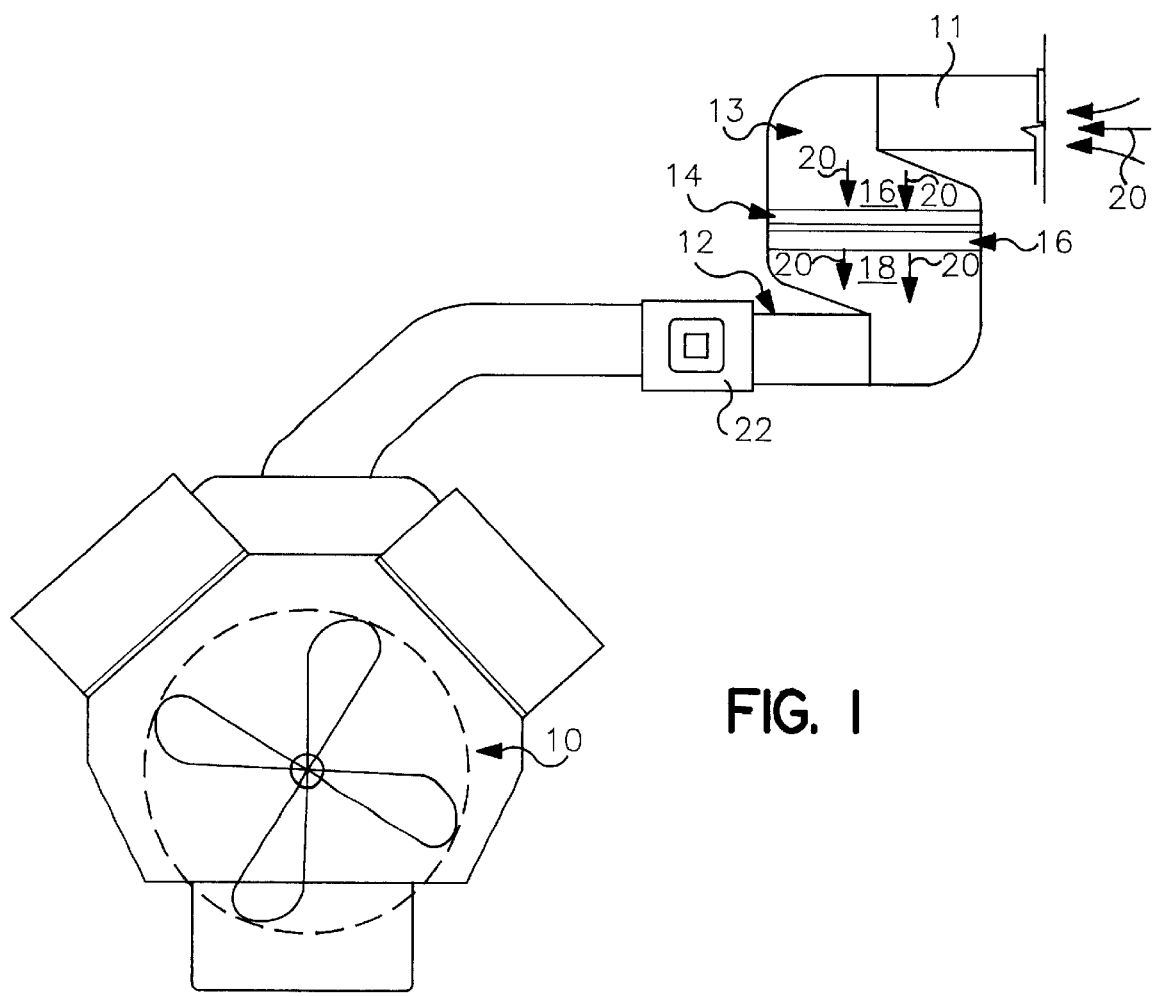
FIG. 1 is a schematic view showing a panel air filter element mounted in an intake of an internal combustion engine.
Figure 2:
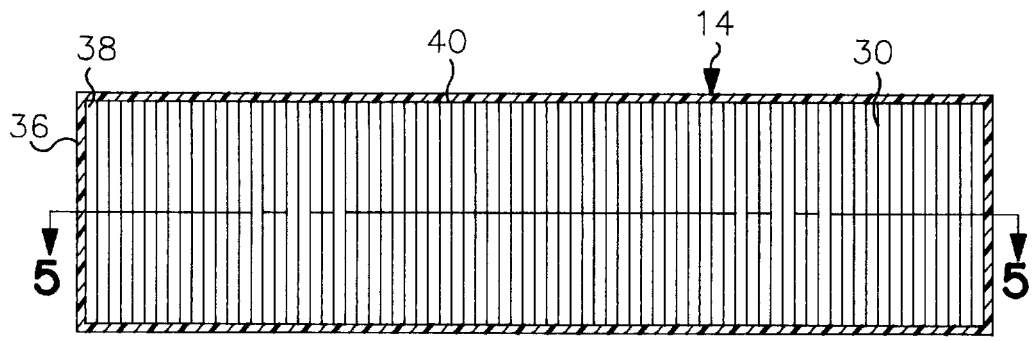
FIG. 2 is a front view showing the upstream side of the filter element configured in accordance with the present invention.
Figure 3:
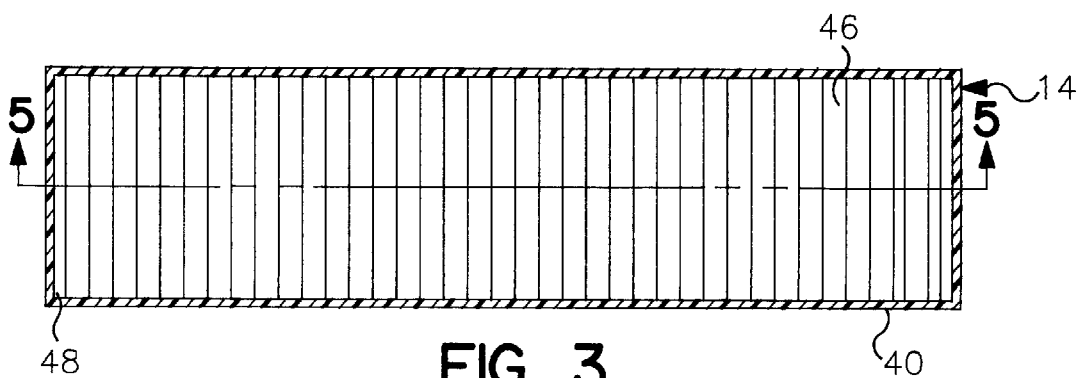
FIG. 3 is a back view showing the downstream side of the filter element in accordance with the present invention.

Referring now to FIG. 1, there is shown an internal combustion engine 10 which receives air through an inlet 11 of an air intake 12. Positioned in the air intake 12 is a filter housing 13 retaining a panel-type filter element 14 which has an upstream side 16 and a downstream side 18. A high speed stream of air 20 enters the inlet 11, passes through the upstream side 16 of the filter element 14 and emerges through the downstream side 18 of the filter element before passing to the engine 10. In accordance with present practices, a sensor 22 is disposed in the air inlet 12 for sensing temperature and pressure, which signals are used to adjust various parameters in the engine 10.

Referring now to FIGS. 2–5, where the filter element 14 is shown in detail, it is seen that the filter element includes a first filter media 30 positioned at the upstream side of the airstream 20. The filter media 30 has an upstream face 32 and a downstream face 34 and is configured of a pleated cellulose material. The first filter media 30 has its periphery 36 sealed by a peripheral urethane seal 38 which seals the first filter media within a rectangular plastic frame 40 extending completely around the upstream filter media 30.

Just behind the filter media 30, adjacent its downstream face 34, is an air space 42 which is peripherally enclosed by the plastic frame 40.

At the downstream side of the air space 42, there is a second media 46 which is sealed within the rectangular frame 40 by a peripheral urethane seal 48. The second filter media 46 has the same rectangular shape as the first filter media 30 and has an upstream face 49 and a downstream face 50.

Figure 4:
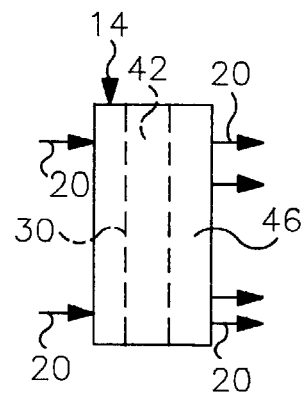
FIG. 4 is an end view of the filter element configured in accordance with the principles of the present invention.
Figure 5:
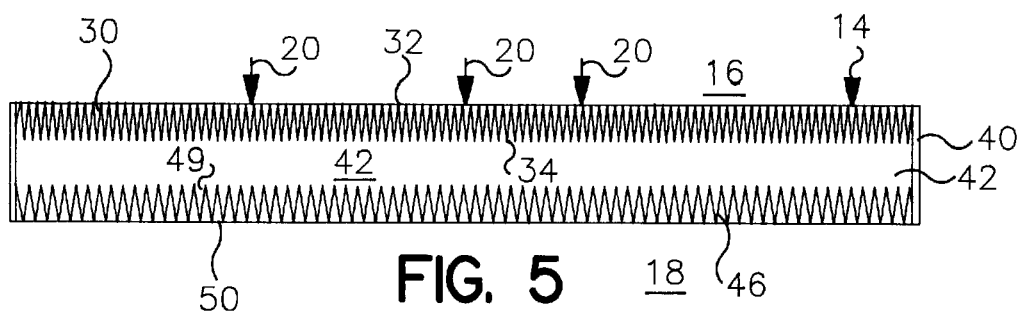
FIG. 5 is an elevation taken along lines 4—4 of FIGS. 2 and 3.

As is illustrated in FIG. 4, the second filter media 46 has three times the open air permeability of the first filter media 30 and is electrostatically charged. Preferably, the second filter media 46 is made of synthetic fiber media which may be, for example, a synthetic spun-bonded material on a cellulose substrate, wherein the material has an electrostatic charge thereon. A filter media material useful as an electrostatically charged material is the material disclosed in expired U.S. Pat. No. 3,998,916 and Reissue U.S. Pat. No. 30,782, both incorporated herein by reference. The filter media of the '916 patent is intermeshed with a pleated cellulose substrate to form the second filter media 46, whereas the first filter media 30 is made of a cellulose fiber media.

In prior art installations of air filters, air entering an air filter element is not laminar or evenly distributed across the face of the filter media. This creates uneven flow distribution which results in an uneven face velocity across the filtering area, which in turn results in an uneven contaminant covering of the filter area and poor media utilization of the filter area. The air stream 20 is laden with particulate contaminants, the majority of which are trapped by the first filter media 30. The particles stopped by the first filter media 30 are generally of a relatively large size. The air passing through the filter media 30 into the space 42 generally entrains smaller contaminant particles. These smaller particles are trapped by the electrostatically charged second filter media 46.

The air space 42 between the first filter media 30 and second filter media 46 provides better utilization of the entire filtering area of the filter element 14 and results in greater contaminant holding ability for the entire filter element. This is because as the air exits from the downstream side 34 of the first filter media 30, a slight back pressure is created in the air space 42. This slight back pressure results in an evening out of the air flow presented to the upstream face 48 of the second filter media 46.

The increase in pressure drop across the filter element 14 is minimized because of the increased permeability of the second filter media 46 which is preferably three times more open than the first filter media 30.

The air space 42 between the first media pack 30 and second media pack 46 results in a pressure equalization across the second filter media 46 which enhances the ability of the second filter media to collect contaminants. This is because the first filter media 30 is not clogged with small particles as well as large particles. By dividing the task of collection between two filter medias, the capacity of the air filter element 14 is substantially greater than the capacity of other air filters.

Figure 6:
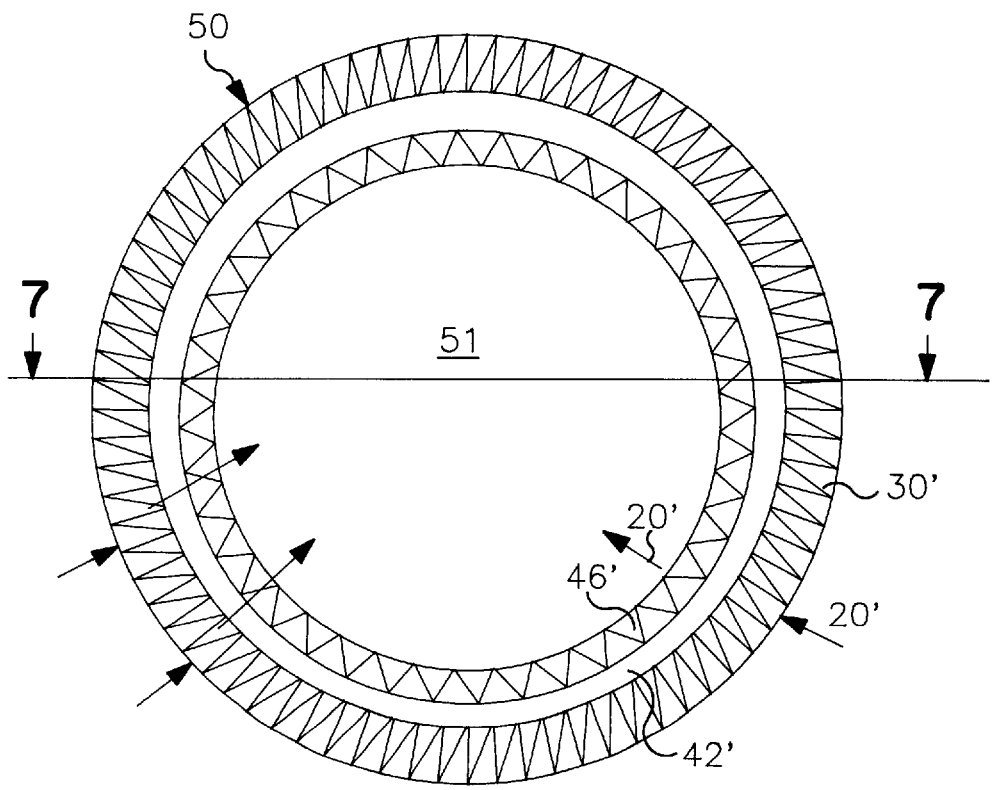
FIG. 6 is a top view of a filter element according to the present invention configured as a radial filter.
Figure 7:
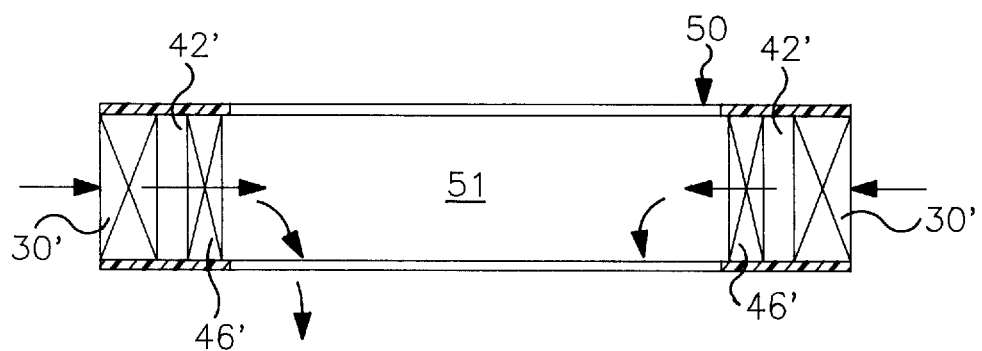
FIG. 7 is a side elevation of the radial filter of FIG. 6 taken along line 7—7 thereof.

Referring now to FIGS. 6 and 7, a second embodiment of the invention is shown, the filter element is now configured as a radial filter element 50, rather than a panel filter element. With the radial filter element 50, there is a first annular filter media 30' separated from a second annular filter media 46' by an annular air space 42'. The ends of the filter medias 30' and 46' are closed by first and second annular frames 40' and the filter medias sealed with respect to the frames by urethane seals 38' and 48'. As with the panel filter element 14, in the radial filter element 50, the second filter 46' is about three times more open to air passage than the first filter media. In addition, like the panel filter element 14, the second filter element has an electrostatic charge and may be made of a synthetic material, while the first filter media is of cellulose material. In operation, the air stream flows in the direction of arrows 20' from outside to the hollow core 51 of the filter 50 and then axially with respect to the filter to the engine.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A filter element useful for filtering inlet air for an internal combustion engine or for cabin air, the element comprising:

a pleated cellulose filter media;

a synthetic polymer filter media positioned downstream of the pleated cellulose filter media, the synthetic polymer filter media being more open to air flow than the pleated cellulose filter media;

an air space defining a gap between the pleated cellulose filter media and the synthetic polymer filter media, wherein the gap is sufficiently wide to even out the face velocity on the synthetic polymer filter media; and a peripheral enclosure around the perimeters of the pleated cellulose filter media and synthetic polymer filter media, the peripheral enclosure enclosing and sealing the air space between the filter media.

2. The filter element of claim 1, wherein the synthetic polymer filter media is electrostatically charged.

3. The filter element of claim 1, wherein the synthetic polymer filter media is about three times more open to air flow than the pleated cellulose filter media.

4. The filter element of claim 1, wherein the filter element is a radial filter element with the filter medias and air space being concentric and substantially annular in shape.

5. The filter element of claim 1, wherein the filter element has a substantially rectangular shape.

6. A filter element in combination with an air intake of an internal combustion engine comprising:

pleated cellulose and electrostatically charged synthetic polymer filter media separated by an air space and peripherally sealed, the filter media being disposed in the air intake with the electrostatically charged synthetic polymer media being substantially more open to air flow than the pleated cellulose media and with the air space being sufficient wide to equalize pressure on the second filter media.

7. The filter element of claim 6, wherein the filter element has a substantially rectangular shape.

8. The filter element of claim 6, wherein the filter element is a radial filter element with the filter medias and air space being concentric and substantially annular in shape.

9. The filter element of claim 6, wherein the synthetic polymer filter media is three times more open to air flow than the pleated cellulose filter media.

\* \* \* \* \*